UNITED STATES PATENT OFFICE.

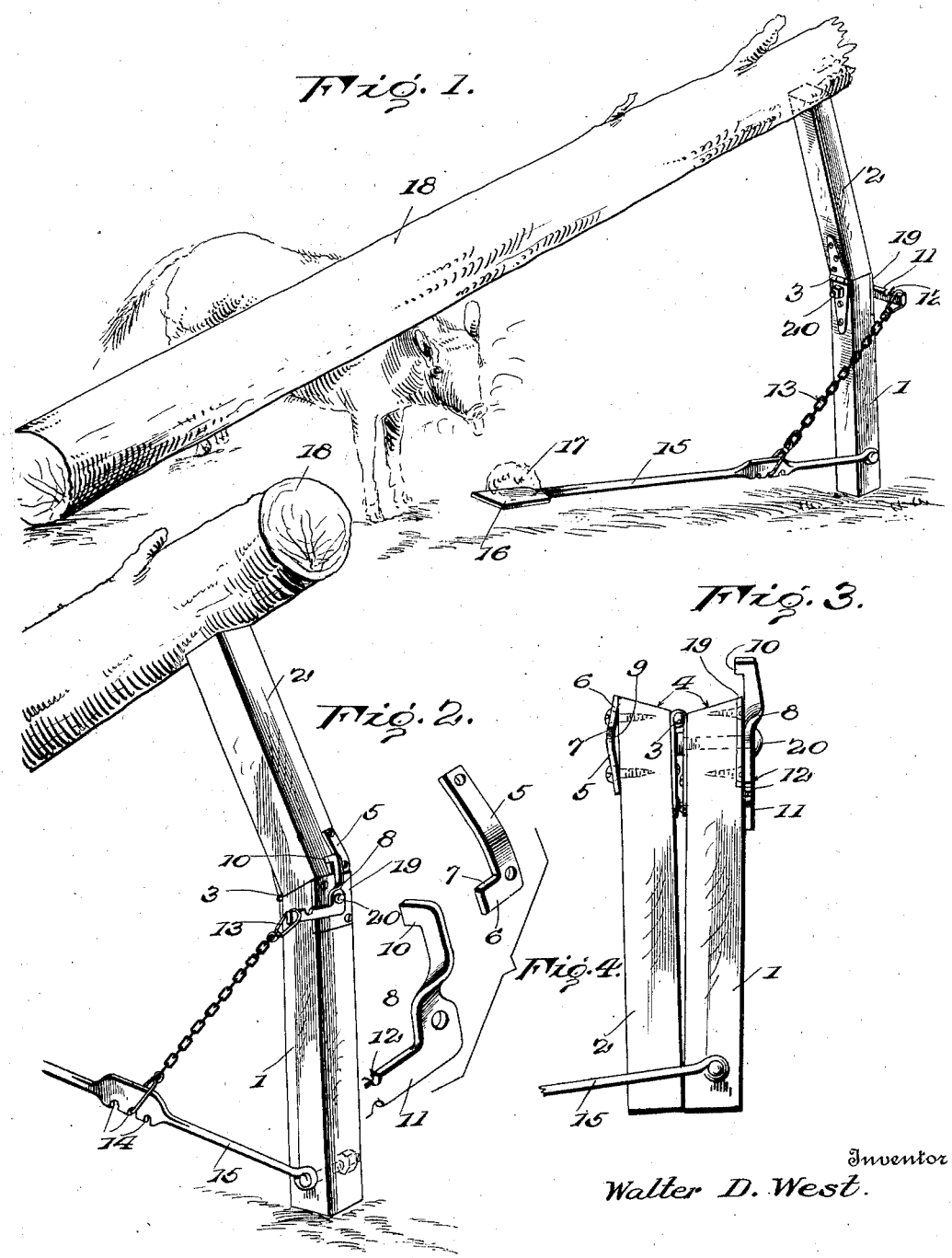
W. D. WEST.
ANIMAL TRAP.
APPLICATION FILED MAR. 22, 1920.
1,360,161.
Patented Nov. 23, 1920.
Inventor
Walter D. West.
By
Lacey & Lacey, Attorneys

WALTER D. WEST, OF UPPER STRASBURG, PENNSYLVANIA.

ANIMAL-TRAP.

1,360,161.  Specification of Letters Patent.  Patented Nov. 23, 1920.

Application filed March 22, 1920. Serial No. 367,950.

*To all whom it may concern:*

Be it known that I, WALTER D. WEST, a citizen of the United States, residing at Upper Strasburg, in the county of Franklin and State of Pennsylvania, have invented certain new and useful Improvements in Animal-Traps, of which the following is a specification.

This invention has for its object the provision of simple, inexpensive and efficient means whereby wild animals may be caught and securely held. The invention seeks to provide means whereby a log or similar weight will be supported in a position above the ground until released by the animal to be trapped and by the efforts of the animal to remove bait will be caused to drop onto the animal's body or neck and pin him to the ground.

The invention is illustrated in the accompanying drawings, in which—

Figure 1 is a perspective view of the trap arranged for use;

Fig. 2 is a similar view looking at the side opposite that appearing in Fig. 1;

Fig. 3 is a side view showing the position of the parts when the trap has been sprung;

Fig. 4 is a detail perspective view of the trigger devices.

In carrying out my invention, I employ a standard consisting of a foot member 1 and a trip member 2 which are connected end to end by a hinge 3 so that the upper member when extended will stand at a slight angle to the lower member, the opposed end surfaces of the parts being beveled, as indicated at 4 in Fig. 3. Upon the outer or rear side of the trip member 2, at the lower end thereof, I secure a latch or holding device 5 which may conveniently be a small casting having a lip 6 disposed at a right angle to its major portion whereby to present a shoulder 7 to be engaged by the trigger 8. The latch 5 is secured permanently to the tripping member 2 by screws or other fasteners and is offset, as shown at 9 in Fig. 4, whereby the shoulder 7 will be spaced somewhat from the face of the member 2 and more readily engaged by the trigger. The trigger is an angle lever fulcrumed upon the supporting member 1 and having its upstanding arm provided at its extremity with a tooth 10 adapted to engage over and bear upon the shoulder 7, as shown clearly in Fig. 2 and as will be readily understood. The lateral arm 11 of the trigger is provided with a plurality of notches 12 in any one of which the end link of a chain 13 may be engaged. The said chain extends downwardly from the trigger and may be engaged in any one of a plurality of notches 14 formed in the lower end of the bait-carrying lever 15, the said lever 15 being pivoted at one end to the side of the standard 1 near the lower end thereof and extending inwardly therefrom, as clearly shown in Fig. 1. The free end of this lever is expanded, as shown at 16, so as to form a support for bait, indicated at 17. In setting the trap, the members 1 and 2 of the support are brought into approximate alinement so that their beveled end surfaces 4 will engage, after which the trigger is swung over into engagement with the shoulder 7 of the latch and will thereby hold the members in the relative position shown in Figs. 1 and 2. The chain 13 is then engaged over the free end of the trigger and the member 1 of the standard is set upright on the ground, as shown in Fig. 1. Bait is placed upon the bait holder and a log or beam 18 is then disposed so that it will lie approximately in the vertical plane of the bait-carrying arm or lever in an inclined position with its upper end resting upon the upper extremity of the tripping member 2, as clearly shown in Figs. 1 and 2 of the drawings.

When an animal is attracted by the bait and endeavors to withdraw the same he will bring his weight to bear upon the lever 15 so that the said lever will be swung downwardly and a pull exerted through the chain 13 upon the trigger which will cause the trigger to swing about its fulcrum and withdraw the tooth 10 from the shoulder 7. Inasmuch as the tripping member 2 is inclined relative to the supporting member 1 and the weight of the beam or log 18 is thrust directly upon the said tripping member, said member will swing downwardly immediately upon the trigger being released from the latch and the log or beam will thereupon fall across the neck of the animal and throw him to the ground and hold him until the trapper can capture him.

The fulcrum of the trigger may, of course, be carried solely by the lower member of the standard but in order to prevent the standard splitting under the strain which would be ordinarily transmitted to it through the fulcrum, I employ a wear plate 19 which is secured rigidly to the outer face of the standard and the fulcrum 20 extends through the said plate and through the lower leaf of the hinge 3, as clearly shown in the drawings.

My device is exceedingly simple in its construction and may be produced at a very low cost. It is effective in operation inasmuch as a very light touch upon the free end of the bait-carrying lever will swing the same downward and withdraw the trigger from the latch to precipitate the log or beam.

Having thus described the invention, what is claimed as new is:

1. A trap comprising a standard consisting of an upper member and a lower member hinged together with the upper member disposed at an angle to the lower member and resting thereon, a trigger member bridging the joint between the members and normally holding the members in extended relation, and bait-carrying means mounted on the lower member for releasing the trigger whereby to precipitate a weight supported upon the said upper member.

2. A trap comprising a standard consisting of two members hinged together and adapted to support one end of a beam, the upper member of the standard being disposed at an angle to the lower member, a latch on the upper member adjacent the meeting ends of the members, an angular trigger fulcrumed upon the lower member of the standard and provided at one extremity with a tooth engaging said latch, a bait-carrying lever fulcrumed upon the lower member of the standard, and a flexible connection between the trigger and said lever.

3. A device for the purpose set forth comprising a standard consisting of two members hinged together and having their hinged ends beveled whereby one member may rest upon the other member at an angle thereto, a latch on one member adjacent the meeting ends thereof, a trigger pivoted upon the other member adjacent the meeting ends thereof to engage said latch, a bait-carrying lever fulcrumed at one end upon the lower member of the standard at the lower end thereof and extending laterally therefrom, and a chain engaged upon the free end of the trigger and also engaged upon the bait-holding lever between the ends thereof.

4. A device for the purpose set forth comprising a standard consisting of two hingedly connected members having their opposed ends beveled whereby the upper member of the standard will be disposed at an angle to the lower member, a latch plate secured upon the upper member and offset therefrom and having a lateral lip presenting a transverse shoulder at the offset portion, a two-armed trigger fulcrumed upon the lower member of the standard at the junction of its arms and having its upstanding arm provided with a lateral tooth to engage over the shoulder on the latch plate, a bait-carrying lever fulcrumed upon the lower member of the standard and extending laterally therefrom, and a chain having its lower end engaged upon said bait-holding lever and its upper end engaged over the lateral arm of the trigger.

In testimony whereof I affix my signature.

WALTER D. WEST. [L. S.]